(12) United States Patent
Ichihashi

(10) Patent No.: US 6,603,985 B1
(45) Date of Patent: Aug. 5, 2003

(54) RINGING TONE CONTROL METHOD AND DEVICE FOR MOBILE COMMUNICATION APPARATUS

(75) Inventor: Tamami Ichihashi, Saitama (JP)

(73) Assignee: NEC Corporation, Tokyo (JP)

( * ) Notice: Subject to any disclaimer, the term of this patent is extended or adjusted under 35 U.S.C. 154(b) by 463 days.

(21) Appl. No.: 09/592,174

(22) Filed: Jun. 12, 2000

(30) Foreign Application Priority Data

Jun. 15, 1999 (JP) .......................................... 11/167707

(51) Int. Cl.[7] .................................................. H04B 1/38
(52) U.S. Cl. ...................................... 455/567; 455/550
(58) Field of Search ................................ 455/567, 550, 455/575, 458, 414, 556, 564

(56) References Cited

U.S. PATENT DOCUMENTS

| | | | | | |
|---|---|---|---|---|---|
| 5,481,599 | A | * | 1/1996 | MacAllister et al. ... | 379/101.01 |
| 5,864,861 | A | * | 1/1999 | Williams ..................... | 707/101 |
| 5,901,218 | A | * | 5/1999 | Kato ........................ | 379/373.03 |
| 6,094,587 | A | * | 7/2000 | Armanto et al. ............. | 455/567 |
| 6,134,455 | A | * | 10/2000 | Corkum ...................... | 455/567 |
| 6,366,791 | B1 | * | 4/2002 | Lin et al. ................... | 455/567 |
| 6,470,196 | B1 | * | 10/2002 | Yamashita .................. | 455/567 |

FOREIGN PATENT DOCUMENTS

| | | |
|---|---|---|
| EP | 0 125 012 | 11/1984 |
| EP | 0 416 803 A2 | 3/1991 |
| GB | 2 103 039 | 2/1983 |
| GB | 2 257 328 | 1/1993 |
| GB | 2 339 644 | 2/2000 |
| GB | 2 345 221 | 6/2000 |
| JP | 9-149099 | 6/1997 |
| JP | 9-168042 | 6/1997 |
| JP | 9-181795 | 7/1997 |
| JP | 9-327052 | 12/1997 |
| JP | 10-32858 | 2/1998 |
| JP | 10-215299 | 8/1998 |
| JP | 10-224435 | 8/1998 |
| WO | 96/15611 | 5/1996 |

* cited by examiner

Primary Examiner—William Trost
Assistant Examiner—Sharad Rampuria
(74) Attorney, Agent, or Firm—Scully, Scott, Murphy & Presser

(57) ABSTRACT

In a ringing tone control method for a mobile communication apparatus, a ringing tune is stored in certain units in first and second areas each having a fixed storage capacity. The ringing tune stored in the first area is sounded upon reception of an incoming call. It is determined whether sounding of a ringing tune corresponding to the storage capacity of the first area is completed. The ringing tune stored in the second area is automatically sounded if the determination result indicates the end of the ringing tune. A ringing tone control device is also disclosed.

12 Claims, 5 Drawing Sheets

RINGING TONE CONTROL METHOD AND DEVICE FOR MOBILE COMMUNICATION APPARATUS

BACKGROUND OF THE INVENTION

The present invention relates to a ringing tone control method and device for a mobile communication apparatus which originates and terminates calls by transmitting/receiving radio waves and sounds a tune upon reception of an incoming call.

Conventionally, as a ringing tone to be sounded by a portable telephone upon reception of an incoming call, a ringing beep tone, ringing tune, or a single original ringing tune is set. As a method of controlling these ringing tones, the method shown in FIG. 5 is known.

Referring to FIG. 5, if a ringing beep tone is selected as a ringing tone to be sounded upon reception of an incoming call by a user in a ringing tone mode, a ringing beep tone is sounded in response to an incoming call to the portable telephone (steps S51 to S53).

If a ringing tune is selected as a ringing tone, the ringing tune is sounded in response to an incoming call to the portable telephone (steps S51, S52, S54, and S55). When the sounding of the ringing tune is completed (step S56), the flow returns to step S55 to restart the ringing tune sounding operation, thereby continuously sounding the ringing tune.

If a single original ringing tune is selected, the single original ringing tune is sounded in response to an incoming call to the portable telephone (steps S51, S52, S54, and S57). In sounding the single original ringing tune, if a memory is not filled to capacity with the single original ringing tune, the end of the ringing tune is determined upon detection of an end code or the absence of intermittent ringing (step S58). In this case, the flow returns to step S57 to restart ringing tune sounding operation, thereby continuously sounding the single original ringing tune.

If the memory is filled to capacity with the single original ringing tune, sounding operation is performed up to the end of the single original ringing tune (step i). Thereafter, the flow returns to step S57 to restart single original ringing tune sounding operation, thereby continuously sounding the single original ringing tune.

As shown in FIG. 6, when the user is to generate an interrupt for speech communication while the ringing beep tone, ringing tune, or single original ringing tune is sounded, he/she operates a start key to stop the ringing tone (steps S61 and S62), and then performs speech communication (step S63).

In the above conventional method of controlling ringing tones, however, since a ringing tune is sounded by repeatedly sounding a short phrase, a ringing tune with a long phrase cannot be sounded. In sounding a single original ringing tune, since the number of notes that can be stored in the memory is limited to a memory capacity corresponding to one tune, a single original ringing tune with a long phrase cannot be obtained. As in the case of a ringing tune, therefore, a single original ringing tune with a short phrase is repeatedly sounded.

SUMMARY OF THE INVENTION

It is an object of the present invention to provide a ringing tone control method and device for a mobile communication apparatus, which can easily sound a tune consisting of a large number of notes without increasing the storage capacity for one tune.

In order to achieve the above object, according to the present invention, there is provided a ringing tone control method for a mobile communication apparatus, comprising the steps of storing a ringing tune in certain units in first and second areas each having a fixed storage capacity, sounding the ringing tune stored in the first area upon reception of an incoming call, determining whether sounding of a ringing tune corresponding to the storage capacity of the first area is completed, and automatically sounding the ringing tune stored in the second area if the determination result indicates the end of the ringing tune.

DESCRIPTION OF THE PREFERED EMBODIMENT

The present invention will be described in detail below with reference to the accompanying drawings.

Figure 4:
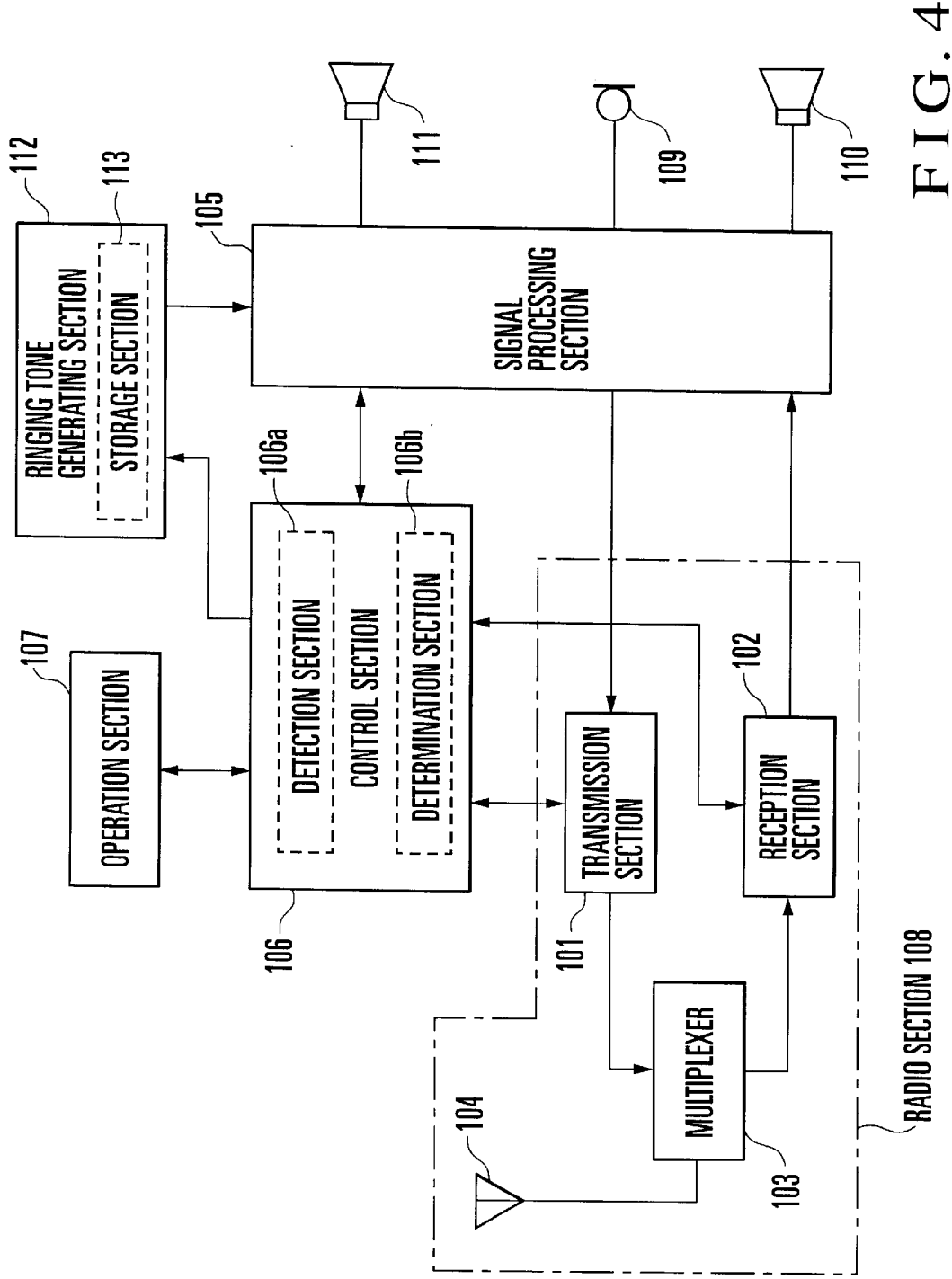
FIG. 4 is a block diagram of a portable telephone for performing ringing tone sounding operation in FIG. 1.

FIG. 4 shows a portable telephone according to an embodiment of the present invention. Referring to FIG. 4, a portable telephone serving as a mobile communication apparatus includes a control section 106 for controlling the overall portable telephone and an operation section 107 which is connected to the control section 106 and has operation keys for performing various operations of the portable telephone. The control section 106 includes a detection section 106a for detecting the end code of a tune and a determination section 106b for determining the end of a tune corresponding to a storage capacity. With the operation section 107, a user inputs an original ringing tune as well as predetermined characters and symbols.

A radio section 108 comprised of a transmission section 101, reception section 102, multiplexer 103, and antenna 104 is connected to the control section 106. The control section 106 controls the radio section 108 to transmit/receive radio signals, and also performs termination control upon reception of an incoming call. A signal processing section 105 for performing signal processing of a speech signal is connected to the radio section 108. A microphone 109 for inputting speech, a receiver 110 for outputting speech, and a sounder 111 for outputting a ringing tone including a ringing beep tone, ringing tune, and original ringing tune are connected to the signal processing section 105. The operation of the signal processing section 105 is controlled by the control section 106.

Figures 3A, 3B:
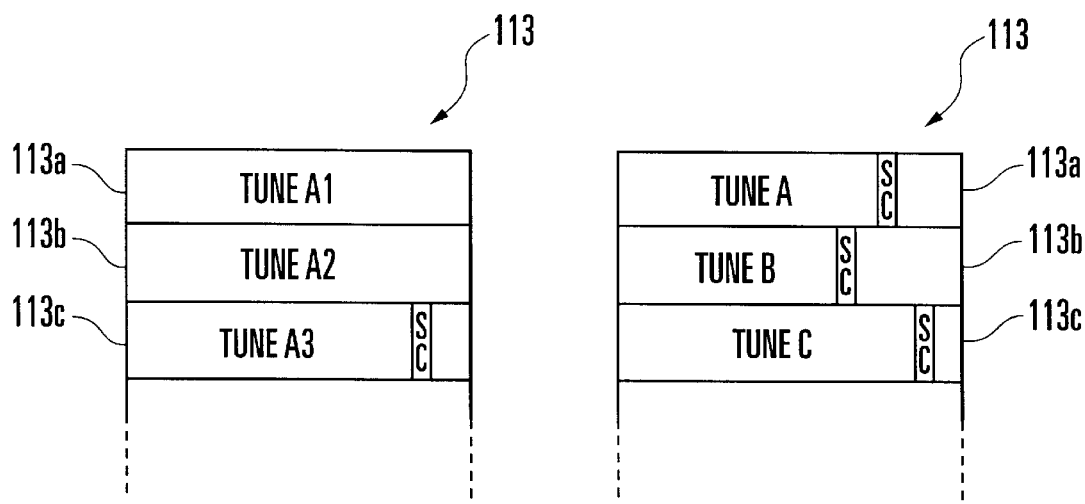
FIGS. 3A and 3B are views each showing how tunes are stored in a storage section in FIG. 1.

A ringing tone generating section 112 for generating a ringing tone is connected to the control section 106. The ringing tone generating section 112 has a storage section 113 formed by a RAM (Random Access Memory) or ROM (Read Only Memory) in which a ringing tone, ringing tune, or original ringing tune is stored. As shown in FIGS. 3A and 3B, the storage section 113 has a fixed storage capacity, and includes first to third areas 113a to 113c for storing an original ringing tune/ringing tune in certain units or individually storing original ringing tunes/ringing tunes.

FIG. 3A shows a case wherein tunes A1, A2, and A3 constituting one original ringing tune A are separately stored in the first to third areas 113a to 113c. In this case, the first and second areas 113a and 113b are filled to capacity with the tunes A1 and A2. In the third area 113c, an end code SC is added to the end of the stored tune A3.

FIG. 3B shows a case wherein three original ringing tunes/ringing tunes A, B, and C are individually stored in the first to third areas 113a to 113c. In the first to third areas 113a to 113c, end codes SC are respectively added to the ends of the stored ringing tunes A, B, and C.

Note that ringing tones and ringing tunes are stored in the storage section 113 in advance at the time of shipment of the portable telephone. The original ringing tunes A (A1 to A3), B, and C are stored in the storage section 113 by inputting notes constituting tunes using the numeral keys and function keys of the operation section 107.

Ringing tone control operation by the control section 106 will be described next with reference to the flow charts of FIGS. 1 and 2. A case wherein the original ringing tune A constituted by the tunes A1 to A3 is stored in certain units in the storage section 113, as shown in FIG. 3A, will be described first.

Figure 1:
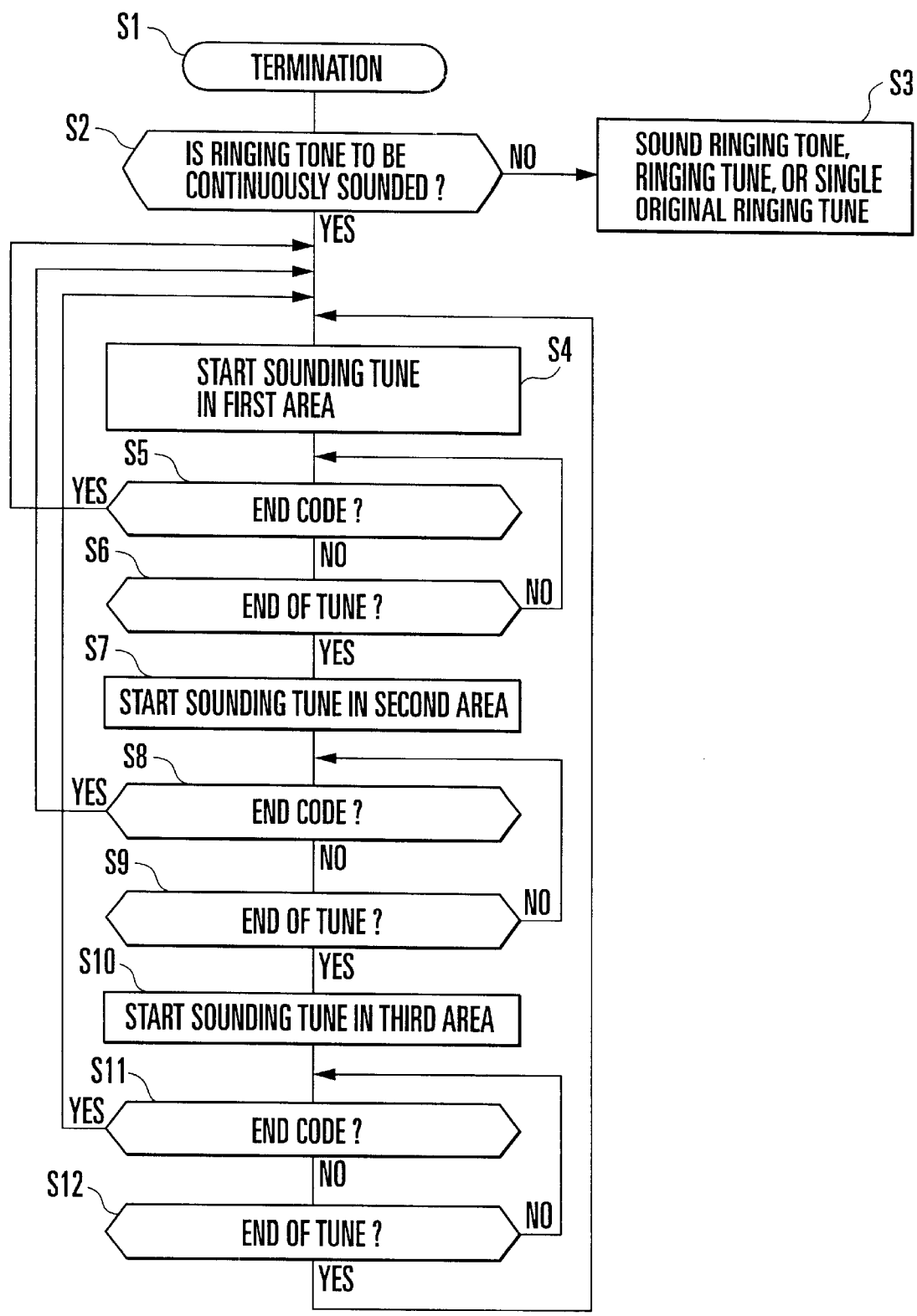
FIG. 1 is a flow chart showing ringing tone control operation of a portable telephone according to an embodiment of the present invention.
Figure 5:
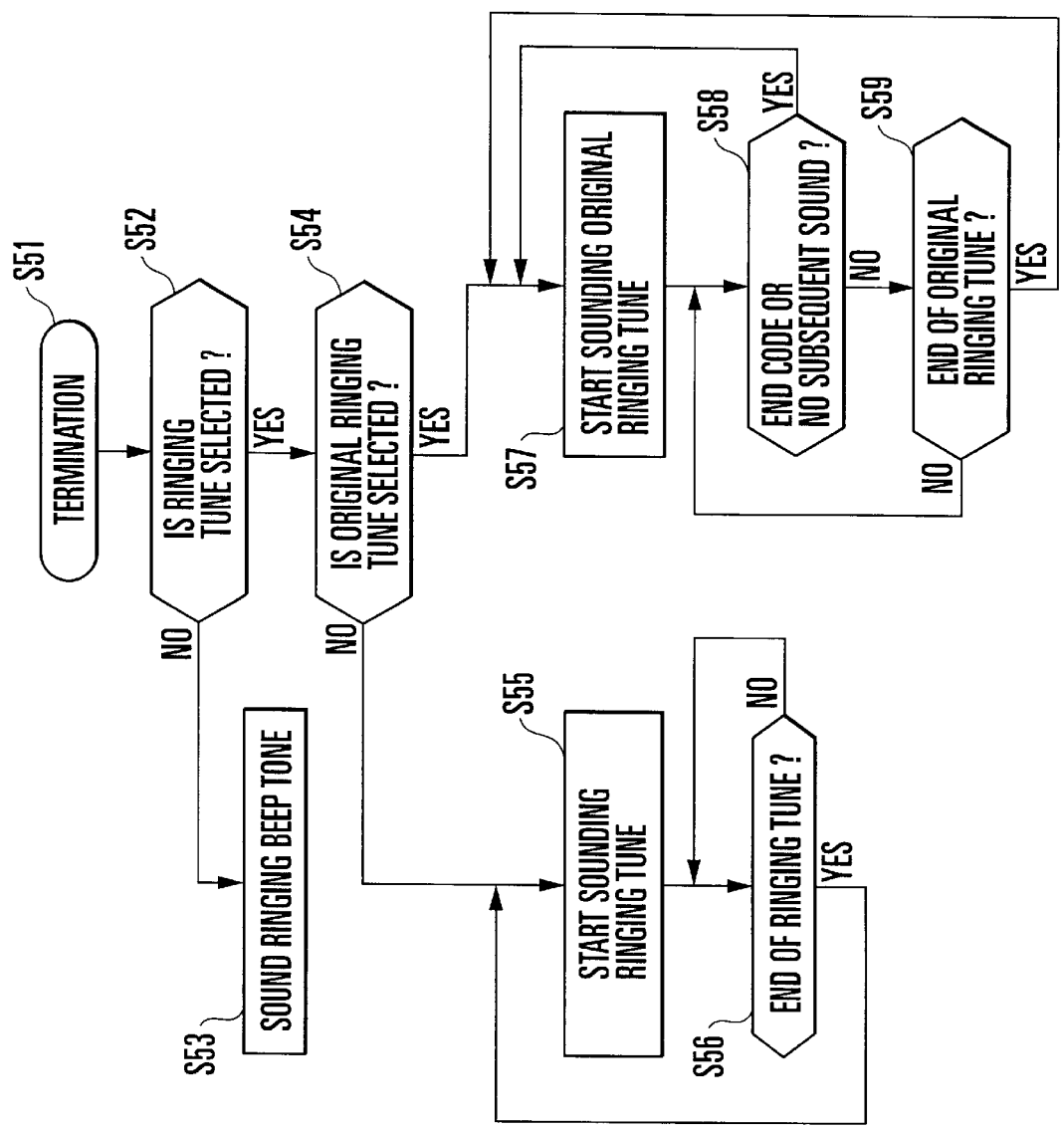
FIG. 5 is a flow chart showing ringing tone control operation of a conventional portable telephone.
Figure 6:
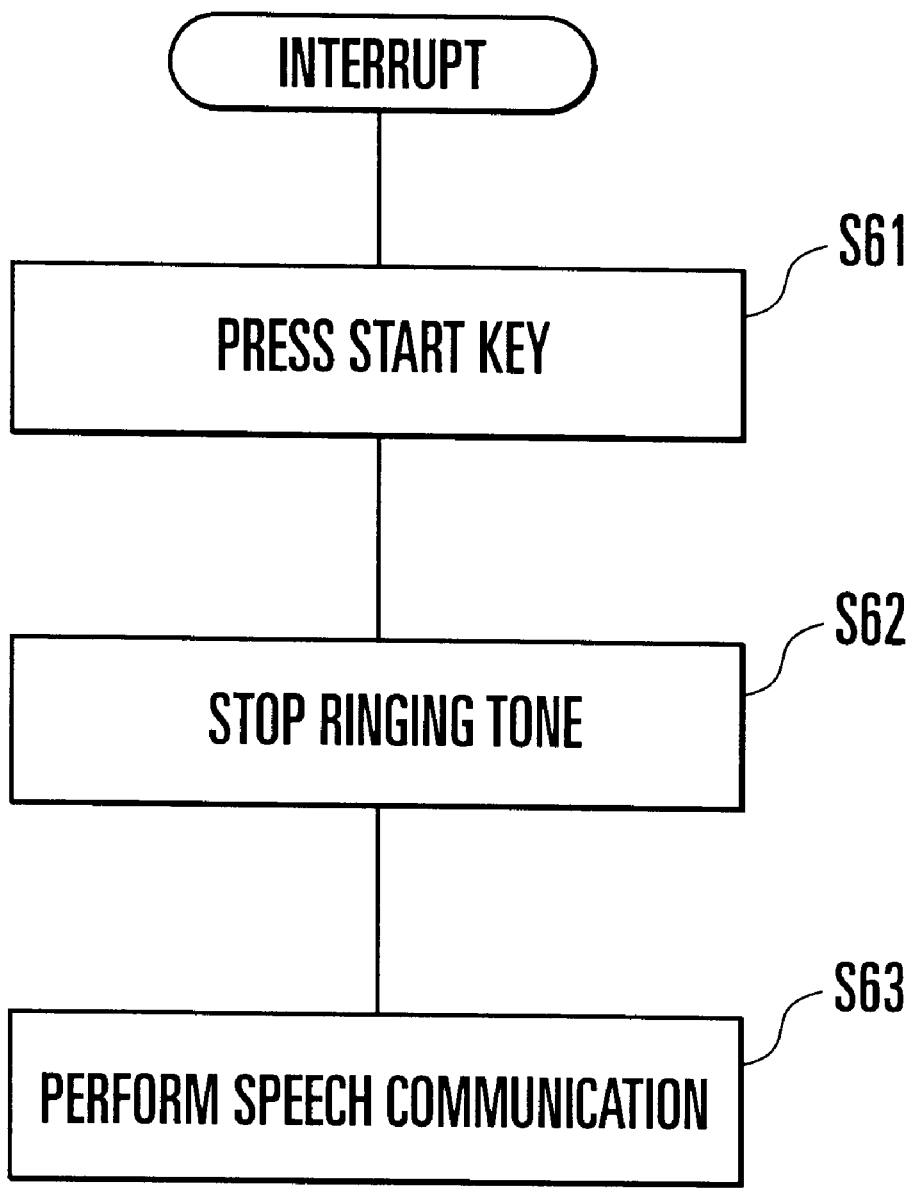
FIG. 6 is a flow chart showing interrupt operation during sounding of a ringing tone in FIG. 5.

Referring to FIG. 1, when the portable telephone receives an incoming call, the control section 106 checks whether a continuous sounding mode for an original ringing tune is selected by ringing tone setting (steps S1 and S2). If the continuous sounding mode is not selected, the control section 106 performs control to repeatedly sound the ringing tone, ringing tune, or original ringing tune stored in the storage section 113 (step S3). The processing in step S3 is the same as that in the prior art in FIG. 5.

If it is determined in step S2 that the continuous sounding mode for the original ringing tune is selected by ringing tone setting, the control section 106 starts sounding the tune A1 stored in the first area 113a of the storage section 113 (step S4).

The control section 106 then checks the presence/absence of the end code SC during the sounding of the tune A1 on the basis of an output from the detection section 106a (step S5). If the end code SC of the tune A1 is not detected, the determination section 106b of the control section 106 checks whether the sounding of the tune A1 is completed (step S6). That is, the determination section 106b checks whether the tune A1 stored in the first area 113a to capacity is sounded to the last. If it is determined that the sounding of the tune A1 is not completed, the processing in steps S5 and S6 is repeated.

If the end of the tune A1 is detected in step S6, the control section 106 starts sounding the tune A2 stored in the second area 113b (step S7). That is, the control section 106 determines that the tune A1 is stored in the first area 113a to capacity, and the tune A is interrupted at the end of the tune A1, and continuously sounds the tune A2.

The control section 106 then checks the presence/absence of the end code SC during the sounding of the tune A2 on the basis of an output from the detection section 106a (step S8). If the end code SC of the tune A2 is not detected, the determination section 106b of the control section 106 checks whether the sounding of the tune A2 is completed (step S9). If the sounding of the tune A2 is not completed, the processing in steps S8 and S9 is repeated.

If the end of the tune A2 is detected in step S9, the control section 106 starts sounding the tune A3 stored in the third area 113c (step S10). That is, the control section 106 determines that the tune A2 is stored in the second area 113b to capacity, and the tune A is interrupted at the end of the tune A2, and continuously sounds the tune A3.

While the tune A3 is sounded, the control section 106 repeatedly checks the presence/absence of the end code SC (steps S11 and S12). If the end code SC of the tune A3 is detected in step S11, the determination section 106b of the control section 106 determines that the tune A having the tune A3 as the last phrase is completed. The flow then returns to step S4. With this operation, the original ringing tune A constituted by the tunes A1 to A3 is repeatedly sounded.

If the end of the tune A3 is detected in step S12, the flow also returns to step S4. If the end code SC of the tune A2 is detected in step S8, the control section 106 also determines that the tune A constituted by the tunes A1 and A2 is completed, and the flow returns to step S4.

A case wherein the tunes A to C are individually stored in the storage section 113 as shown in FIG. 3B will be described next.

If it is determined in step S2 that the continuous sounding mode for the original ringing tune is selected by ringing tone setting, the control section 106 starts sounding the tune A stored in the first area 113a of the storage section 113 (step S4).

The control section 106 then checks the presence/absence of the end code SC of the tune A (step S5). If the tune A is not stored in the first area 113a of the storage section 113 to capacity as shown in FIG. 3A, the end code SC of the tune A is detected. In this case, the control section 106 determines that the tune A is completed. The flow then returns to step S4 to restart sounding the tune A.

When one of the tunes B and C stored in the second and third areas 113b and 113c is to be sounded as a ringing tone, one of the second and third areas 113b and 113c may be selected as an area to be accessed in step S4 by setting operation.

In the above embodiment, tunes constituting an original ringing tune are separately stored in the three storage areas 113a, 113b, and 113c. However, tunes constituting a longer original ringing tune may be separately stored in four or more storage areas. If, for example, 10 storage areas, each having a storage capacity corresponding to 50 notes, are prepared, a first original ringing tune consisting of a maximum of 300 notes and constituted by tunes to be continuously sounded, which are stored in six storage areas, and a second original ringing tune consisting of a maximum of 200 notes and constituted by tunes to be continuously sounded, which are stored in four storage areas, may be selectively used.

In the above embodiment, the detection section 106a detects the end code of each tune. Instead of this operation, however, the detection section 106a may detect intermittent ringing of each tune. In this case, if an output from the detection section 106a indicates the presence of intermittent ringing in step S5, S8, or S11, the flow advances to step S6, S9, or S12. Otherwise, the flow returns to step S4.

Figure 2:
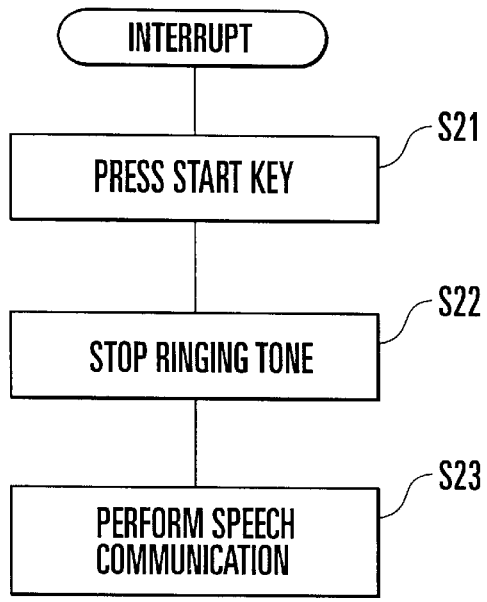
FIG. 2 is a flow chart showing interrupt operation during sounding of a ringing tone in FIG. 1.

FIG. 2 shows an interrupt for speech communication while a ringing tune or original ringing tune is sounded. Referring to FIG. 2, after the user stops a ringing tone by operating the start key (steps S21 and S22), he/she performs speech communication (step S23).

As has been described above, according to the present invention, the original ringing tune A can be provided in a perfect form by continuously sounding the tunes A1, A2, and A3 stored in the storage areas 113a, 113b, and 113c of the storage section 113.

Even if, for example, only 50 characters, i.e., 50 notes, can be stored as one tune in each of the storage areas 113a, 113b, and 113c of the storage section 113, a tune consisting of 150 notes is divided into 50-note tunes, and these tunes are separately stored. In this case, a 150-note tune can be continuously sounded unlike the prior art in which a ringing tune with a short phrase consisting of 50 notes is repeatedly sounded. This makes it possible to use a tune three times longer than that in the prior art as a ringing tune without increasing the capacity of one storage area.

In addition, according to the method of continuously sounding tunes, when the end of a tune is recognized without detection of any end code, the next tune is automatically sounded. This makes it easy to continuously sound one original ringing tune without producing any interruption.

In addition, when the end code of a tune is recognized, sounding of the tune is restarted from the beginning. Therefore, the original ringing tune which is stored in certain units in a plurality of storage areas can be repeatedly sounded.

What is claimed is:

1. A ringing tone control method for a mobile communication apparatus, comprising the steps of:

storing a ringing tune in certain units in first and second areas each having a fixed storage capacity;

sounding the ringing tune stored in said first area upon reception of an incoming call;

determining whether sounding of a ringing tune corresponding to the storage capacity of said first area is completed; and automatically sounding the ringing tune stored in said second area if the determination result indicates the end of the ringing tune.

2. A method according to claim 1, wherein the method further comprises the step of detecting an end code added to the end of the tune stored in said first area, and the step of automatically sounding comprises the step of automatically sounding the ringing tune stored in said second area when sounding of the ringing tune stored in said first area is stopped without detection of the end code.

3. A method according to claim 2, further comprising the step of automatically sounding the ringing tune stored in said first area when the end code is detected.

4. A method according to claim 1, further comprising the step of stopping sounding of a ringing tune when communication is started while the ringing tune is sounded.

5. A method according to claim 1, wherein the method further comprises the step of detecting intermittent ringing of the ringing tune stored in said first area, and the step of automatically sounding comprises the step of automatically sounding the ringing tune stored in said second area when sounding of the ringing tune stored in said first area is completed while intermittent ringing is detected.

6. A method according to claim 5, further comprising the step of sounding the ringing tune stored in said first area again when no intermittent ringing is detected.

7. A method according to claim 1, further comprising the step of stopping sounding a tune when communication is started while the tune is sounded.

8. A ringing tone control device for a mobile communication apparatus, comprising:

storage means having first and second areas, each having a fixed storage capacity, in which a ringing tune is stored in certain units; and control means for sounding the ringing tune stored in said first area upon reception of an incoming call, and automatically sounding a ringing tune stored in said second area when sounding of the ringing tune corresponding to the storage capacity of said first area is completed.

9. A device according to claim 8, wherein said control means comprises determination means for determining whether sounding of a ringing tune corresponding to the storage capacity of said first area is completed.

10. A device according to claim 8, wherein said device further comprises detection means for detecting an end code added to the end of the tune stored in said first area, and said control means automatically sounds the ringing tune stored in said second area when sounding of the ringing tune stored in said first area is completed without detection of the end code by said detection means.

11. A device according to claim 10, wherein said control means sounds the ringing tune stored in said first area again when the end code is detected by said detection means.

12. A device according to claim 8, wherein said control means stops sounding a ringing tune when communication is started while the ringing tune is sounded.

* * * * *